(12) United States Patent
Sjögren et al.

(10) Patent No.: US 8,184,617 B2
(45) Date of Patent: May 22, 2012

(54) CALL CENTER ENABLER

(75) Inventors: Dan Jörgen Sjögren, Löddeköpinge (SE); Anders Fridlund, Lund (SE)

(73) Assignee: Sony Mobile Communications AB, Lund (SE)

( * ) Notice: Subject to any disclaimer, the term of this patent is extended or adjusted under 35 U.S.C. 154(b) by 1543 days.

(21) Appl. No.: 11/390,245

(22) Filed: Mar. 28, 2006

(65) Prior Publication Data

US 2007/0232279 A1    Oct. 4, 2007

(51) Int. Cl.
*H04L 12/66*     (2006.01)

(52) U.S. Cl. ............ 370/352; 370/395.5; 370/259; 370/271; 455/412.2; 455/404.1; 455/414.1; 379/157; 379/158

(58) Field of Classification Search .......... 455/466, 455/414.1, 433, 414.2; 379/201.12, 201.01, 379/37, 45, 49
See application file for complete search history.

(56) References Cited

U.S. PATENT DOCUMENTS

| | | | | |
|---|---|---|---|---|
| 5,943,611 A | * | 8/1999 | Molne | 455/564 |
| 7,836,147 B2 | * | 11/2010 | Reding et al. | 709/217 |
| 2002/0046279 A1 | * | 4/2002 | Chung | 709/227 |
| 2003/0035519 A1 | * | 2/2003 | Warmus | 379/88.17 |
| 2004/0240655 A1 | * | 12/2004 | Swick | 379/218.01 |
| 2005/0078657 A1 | * | 4/2005 | Huey | 370/352 |
| 2009/0029682 A1 | * | 1/2009 | Filho et al. | 455/412.2 |

FOREIGN PATENT DOCUMENTS

| | | |
|---|---|---|
| EP | 1 172 993 A2 | 1/2002 |
| WO | WO 99/17568 | 4/1999 |
| WO | WO 03/032660 | 4/2003 |

* cited by examiner

*Primary Examiner* — Olumide T Ajibade Akonai
*Assistant Examiner* — Emem Stephen
(74) *Attorney, Agent, or Firm* — Patrick B. Horne; Moore & Van Allen, PLLC (57) ABSTRACT

A communication device sends a message to a server requesting a list of call center telephone numbers. The communication device receives the list of call center telephone numbers from the server and provides the list to a user.

16 Claims, 6 Drawing Sheets

CALL CENTER ENABLER

TECHNICAL FIELD OF THE INVENTION

Implementations described herein relate generally to telephony devices and, more particularly, to obtaining updated call center telephone numbers via telephony devices.

BACKGROUND

The use of radio communication networks is rapidly becoming a part of daily life for more and more people around the globe. GSM (Global System for Mobile Communications) networks are just one example of the many different types of radio communication networks that have been implemented world-wide.

Users of such networks often need to know where to turn to obtain support, such as, for example, technical support, customer support, etc. In some cases, a user in a given network is supposed to call their operator for network and/or subscription related issues or a phone manufacturer (e.g., Sony Ericsson) for telephone handset related issues. The telephone numbers of these call centers may frequently change, or the user may have a difficult time attempting to keep track of the multiple, different call center numbers that may be needed to obtain adequate support.

SUMMARY

According to one aspect, a method may include sending a message from a telephone to a server via a network requesting a list of call center telephone numbers. The method may further include receiving the list of call center telephone numbers from the server via SMS or WAP and providing the list to a user.

Additionally, the message may be sent from the telephone to the server via short message service (SMS) or wireless application protocol (WAP).

Additionally, the list of call center telephone numbers may be received from the server via short message service (SMS) or wireless application protocol (WAP).

Additionally, the message may include a mobile network code (MNC) and a mobile country code (MCC) associated with the telephone.

Additionally, the message may further include an International Mobile Equipment Identity (IMEI) number and a phone model associated with the telephone.

Additionally, the method may further include receiving a user request for updated call center telephone numbers and sending the message to the server based on the user request.

Additionally, where providing the list to a user may include providing the list to the user via a graphical user interface associated with the telephone.

Additionally, wherein the list of call center telephone numbers includes at least one of phone manufacturer call center telephone numbers or network operator call center telephone numbers.

According to another aspect, a method may include receiving a request for call center telephone numbers from a mobile station and retrieving the call center telephone numbers. The method may further include sending the call center telephone numbers to the mobile station via SMS or WAP.

Additionally, the request for call center telephone numbers may be received from the mobile station via short message service SMS or wireless application protocol WAP.

Additionally, the request for call center telephone numbers may include a mobile network code (MNC) and a mobile country code (MCC) associated with the mobile station.

Additionally, the request for call center telephone numbers may further include an International Mobile Equipment Identity (IMEI) number and a phone model associated with the mobile station.

Additionally, the call center telephone numbers may be retrieved from a memory based on one or more of the MNC, the MCC, the IMEI or the phone model.

According to a further aspect, a communication device may include a communication interface configured to send a message to a server via short message service (SMS) or wireless application protocol (WAP) requesting a list of call center telephone numbers. The communication device may further include a processing unit configured to receive the list of call center telephone numbers from the server and provide the list to a user.

Additionally, the message may include a mobile network code (MNC) and a mobile country code (MCC) associated with the communication device.

Additionally, the message may further include an International Mobile Equipment Identity (IMEI) number and a phone model associated with the communication device.

Additionally, the communication device may further include a user interface configured to receive a user request for call center telephone numbers, where the message is sent to the server via SMS or WAP based on the user request.

Additionally, the communication device may further include a graphical user interface configured to provide the received list of call center telephone numbers to the user.

Additionally, the list of call center telephone numbers may include at least one of phone manufacturer call center telephone numbers or network operator call center telephone numbers.

Additionally, the communication interface may be further configured to automatically send the message every predetermined period of time.

According to an additional aspect, a mobile station may include a user interface configured to receive a request for call center telephone numbers from a user. The mobile station may further include a communication interface configured to use a short message service (SMS) or wireless application protocol (WAP) to transmit the request to a network location and receive the call center telephone numbers from the network location.

According to yet another aspect, a system may include means for receiving a request for call center telephone numbers from a mobile station via short message service (SMS) or wireless application protocol (WAP). The system may further include means for retrieving the call center telephone numbers and means for sending the call center telephone numbers to the mobile station.

It should be emphasized that the term "comprises/comprising" when used in this specification is taken to specify the presence of stated features, integers, steps, components or groups but does not preclude the presence or addition of one or more other features, integers, steps, components or groups thereof.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

Consistent with aspects of the invention, a mobile station may use SMS or WAP to retrieve updated call center telephone numbers from a remote network location. Mobile station users (e.g., cellular telephone users), thus, can easily access updated call center telephone numbers so that the users can connect calls to desired call centers when support is needed.

Figure 1:
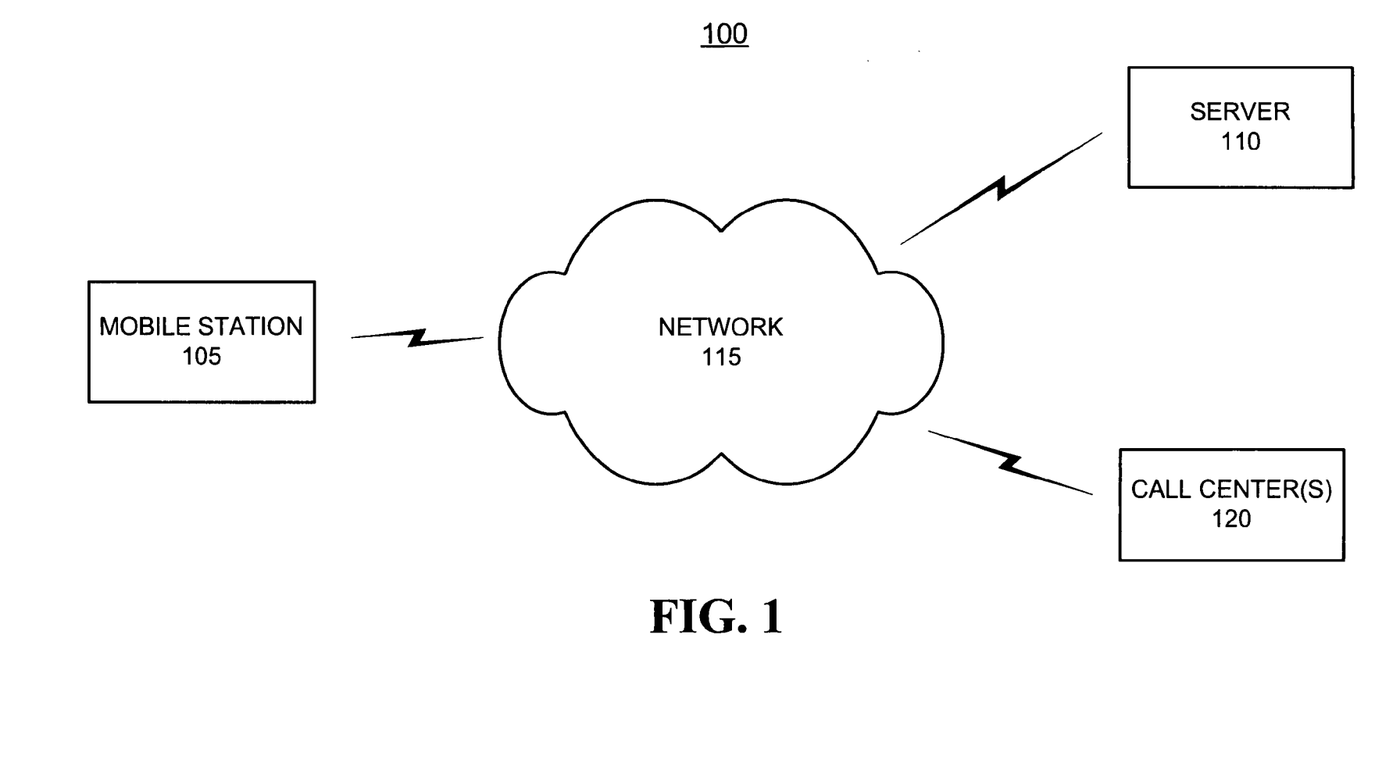
FIG. 1 illustrates an exemplary system in which aspects of the invention may be implemented.

FIG. 1 illustrates an exemplary system 100 in which aspects of the invention may be implemented. System 100 may include a mobile station 105 connected with a server 110 and call center(s) 120 via network 115 using wireless, wired, or optical connection links. Network 115 may include one or more sub-networks utilizing any type of multi-access media, including a local area network (LAN), metropolitan area network (MAN), satellite network, cellular telephone network or other types of multi-access media/networks.

Mobile station 105 may include a telephone, cellular radiotelephone, Personal Communications System (PCS) terminal or the like. A PCS terminal may combine a cellular radiotelephone with data processing, facsimile and data communications capabilities. Mobile station 105 may further include a personal digital assistant (PDA), a conventional laptop and/or palmtop receiver, or another appliance that includes a radiotelephone transceiver, or the like. A PDA may include a radiotelephone, a pager, Internet/intranet access, a web browser, an organizer, calendars and/or a global positioning system (GPS) receiver. Mobile station 105 may further be referred to as a "pervasive computing" device.

Server 110 includes a server entity that may store updated call center telephone numbers associated with call center(s) 120. Call center(s) 120 may include network operator call centers, telephone service provider call centers, and/or telephone manufacturer (e.g., Sony Ericsson) call centers. The functionality of server 110 may, in some implementations, be implemented at one or more of call center(s) 120.

Figure 2:
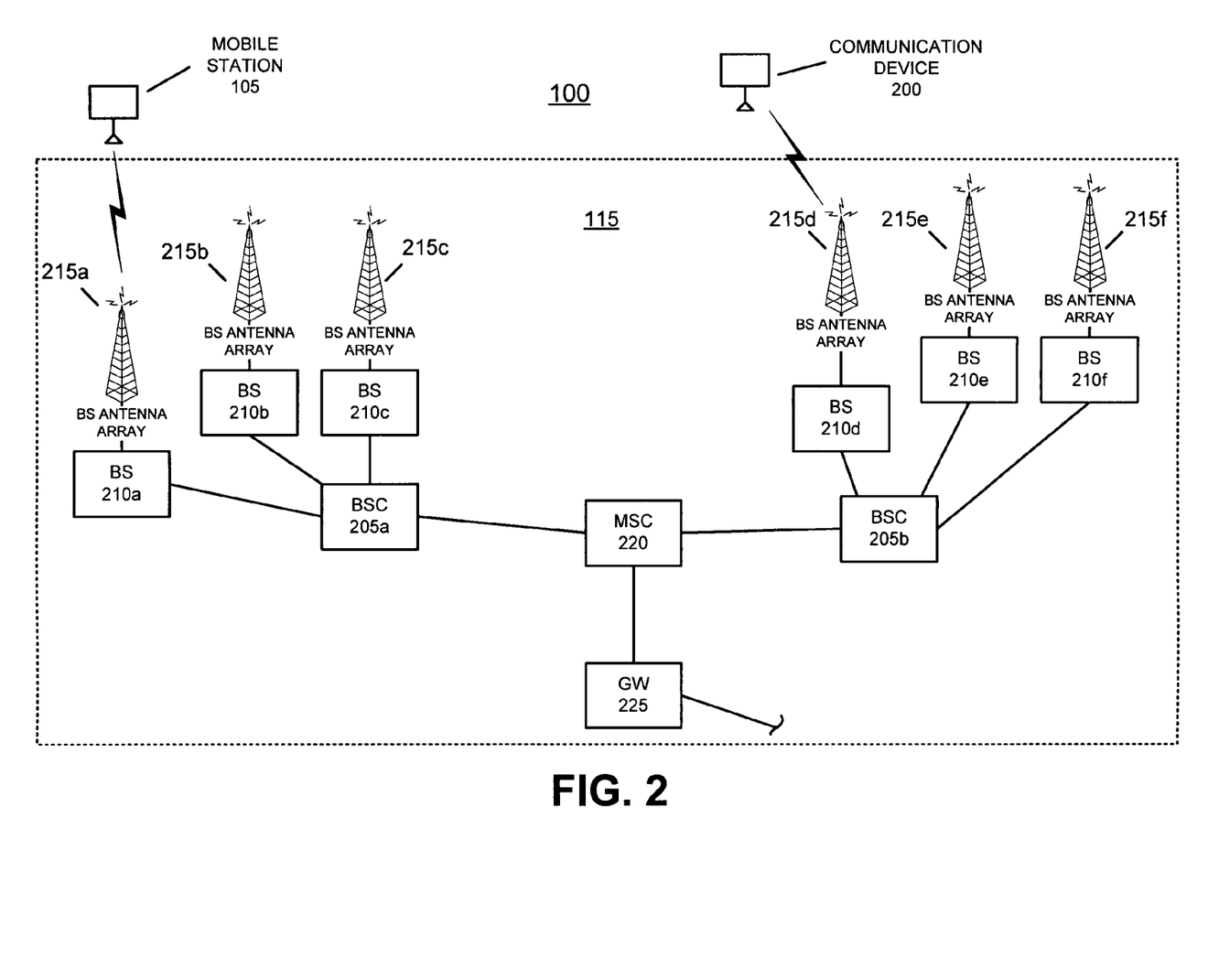
FIG. 2 illustrates an exemplary system that includes a cellular network consistent with principles of the invention.

FIG. 2 illustrates one example of system 100 implemented using a cellular network. System 100 may include mobile station 105 and another communication device 200 and a cellular network 115. Cellular network 115 may include one or more base station controllers (BSCs) 205a-205b, multiple base stations (BSs) 210a-210f, multiple base station antenna arrays 215a-215f, one or more mobile switching centers (MSCs), such as MSC 220, and one or more gateways (GWs), such as GW 225.

Cellular network 115 consists of components conventionally used for transmitting data to and from mobile station and communication device 200. Such components may include base station antenna arrays 215a-215f, which transmit and receive, via appropriate data channels, data from mobile stations within their vicinity. Base stations 210a-210f connect to their respective antenna arrays 215a-215f, and format the data transmitted to, or received from the antenna arrays 215a-215f in accordance with conventional techniques, for communicating with BSCs 205a-205b or a mobile station, such as mobile station 105. Among other functions, BSCs 205a-205b may route received data to either MSC 220 or a base station (e.g., BSs 210a-210c or 210d-210f). MSC 220 routes received data to BSC 205a or 205b. GW 225 may route data received from an external domain (not shown) to an appropriate MSC (such as MSC 220), or from an MSC to an appropriate external domain. Server 110 and/or call center(s) 120 (not shown in FIG. 2) may connect to cellular network 115 via MSC 220 or via another network (e.g., the Internet) connected to GW 225.

Figure 3:
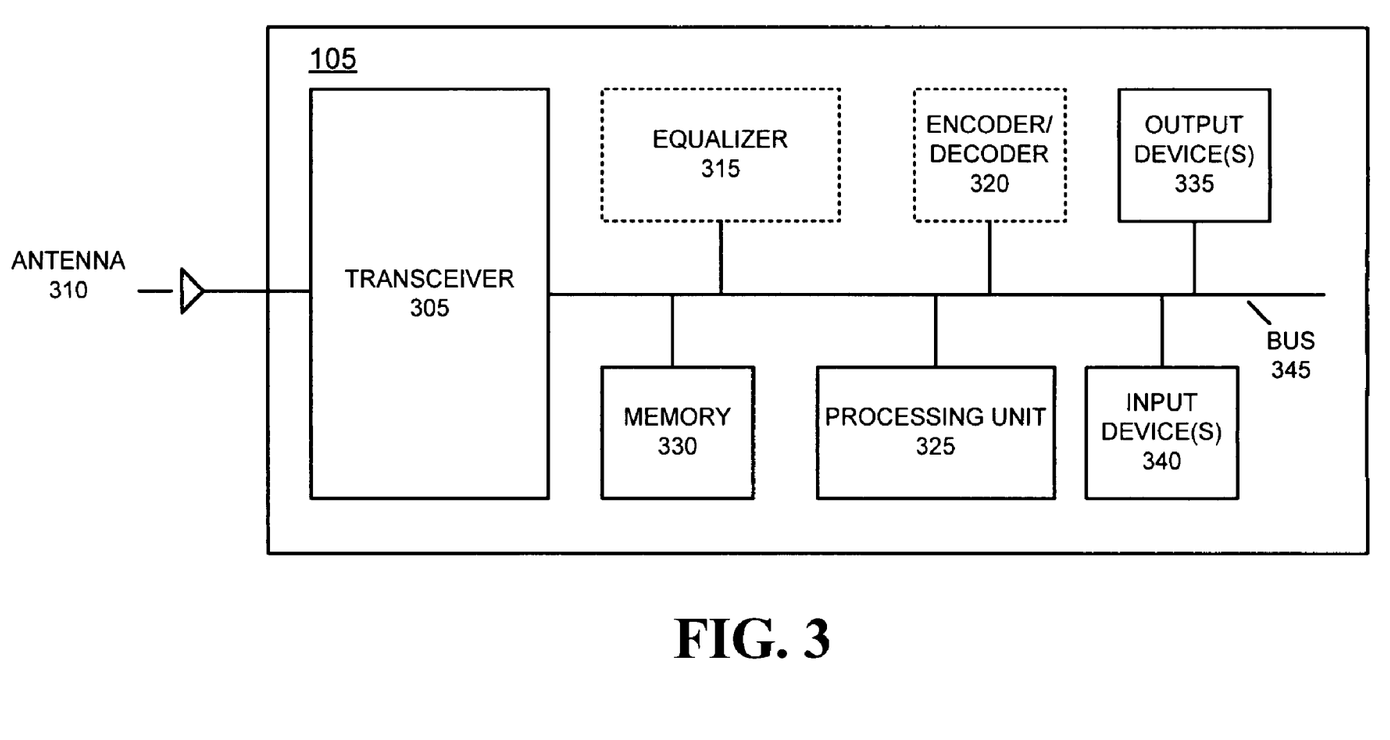
FIG. 3 illustrates an exemplary mobile station consistent with principles of the invention.

FIG. 3 illustrates an exemplary mobile station 105 consistent with the present invention. Mobile station 105 may include a transceiver 305, an antenna 310, an optional equalizer 315, an optional encoder/decoder 320, a processing unit 325, a memory 330, an output device(s) 335, an input device(s) 340, and a bus 345.

Transceiver 305 may include transceiver circuitry well known to one skilled in the art for transmitting and/or receiving symbol sequences in a network, such as network 115, via antenna 310. Transceiver 305 may include, for example, a conventional RAKE receiver. Transceiver 305 may further include mechanisms for estimating the signal-to-interference ratio (SIR) of received symbol sequences. Transceiver 305 may additionally include mechanisms for estimating the propagation channel Doppler frequency.

Equalizer 315 may store and implement Viterbi trellises for estimating received symbol sequences using, for example, a maximum likelihood sequence estimation technique. Equalizer 315 may additionally include mechanisms for performing channel estimation.

Encoder/decoder 320 may include circuitry for decoding and/or encoding received or transmitted symbol sequences. Processing unit 325 may perform all data processing functions for inputting, outputting, and processing of data including data buffering and terminal control functions, such as call processing control, user interface control, or the like. Memory 330 provides permanent, semi-permanent, or temporary working storage of data and instructions for use by processing unit 325 in performing processing functions. Memory 330 may include large-capacity storage devices, such as a magnetic and/or optical recording medium and its corresponding drive. Output device(s) 335 may include mechanisms for outputting data in video, audio, and/or hard copy format. Input device(s) 340 permit entry of data into mobile terminal 105 and may include a user interface and a microphone (not shown). The microphone can include mechanisms for converting auditory input into electrical signals. Bus 345 interconnects the various components of mobile terminal 105 to permit the components to communicate with one another. The configuration of components of mobile terminal 105 illustrated in FIG. 3 is for illustrative purposes only. One skilled in the art will recognize that other configurations may be implemented.

Exemplary Call Center Telephone Number Update Process

Figure 4:
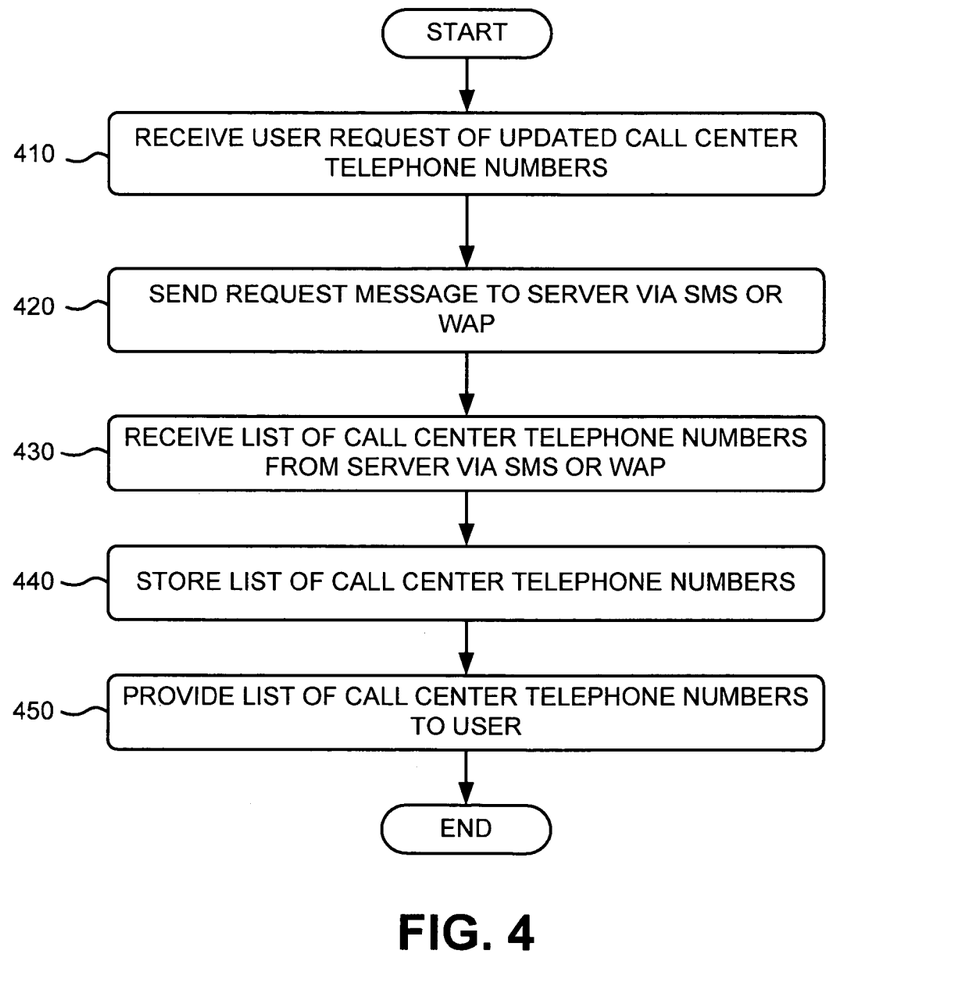
FIG. 4 is a flowchart of an exemplary process for updating call center telephone numbers at a mobile station consistent with principles of the invention.
Figure 6A:
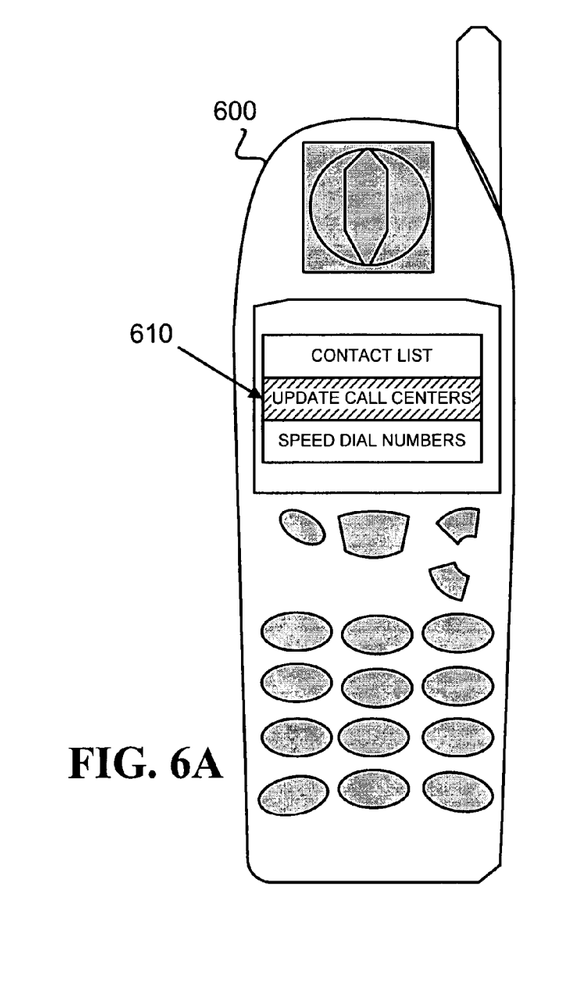
FIGS. 6A and 6B illustrate use of exemplary user interfaces of a mobile station for obtaining updated call center telephone numbers consistent with principles of the invention.

FIG. 4 is a flowchart of an exemplary process for providing and/or updating a list of call center telephone numbers maintained at mobile station 105 consistent with principles of the invention. The exemplary process may begin with mobile station 105 receiving a request from a user for call center or updated call center telephone numbers (block 410). The user may desire to place a call to a call center of a telephone manufacturer (e.g., Sony Ericsson) or a call center of a telephone network operator. For example, a user using mobile telephone 600 illustrated in FIG. 6A may select "update call centers" from a graphical user interface 610 to request updated call center telephone numbers or an "obtain call centers numbers" selection if no call center information has already been obtained.

Mobile station 105 may send a request message to server 110 via short message service (SMS), wireless application protocol (WAP) or some other technique requesting updated call center telephone numbers (block 420). Mobile station 105 may use existing protocols associated with SMS, WAP, or other techniques/protocols for sending the request message. As shown in the exemplary signaling diagram of FIG. 5, mobile station 105 may send a request message 510 to server 110. Request message 510 may include a mobile network code (MNC) and mobile country code (MCC) associated with the network that is serving mobile station 105. Request message 510 may further include identification information of the phone model (model number or other identifier) of the phone from which request message 510 is being sent. Request message 510 may additionally include the International Mobile Equipment Identity (IMEI) number of mobile station 105.

Figure 5:
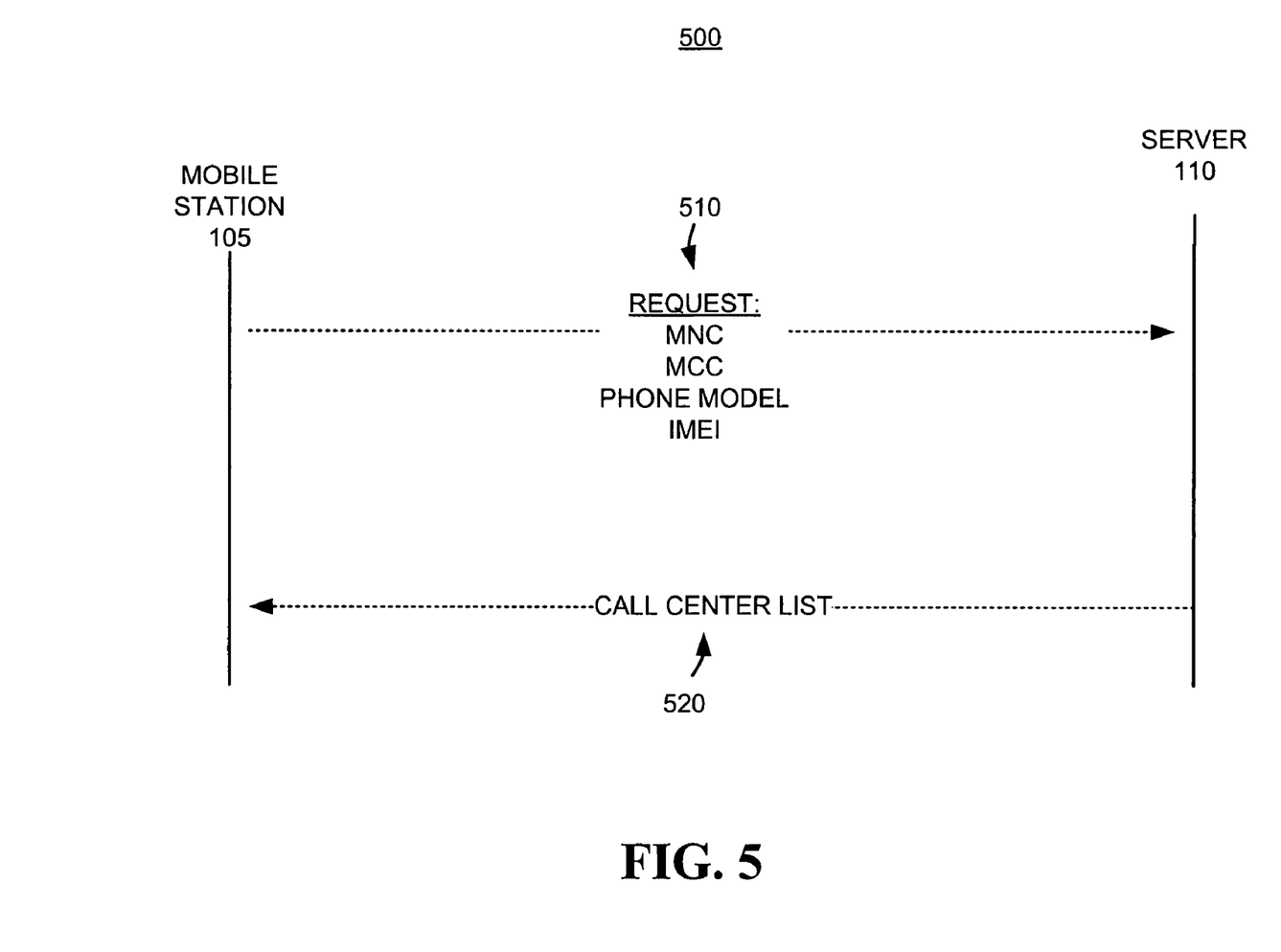
FIG. 5 is a diagram of exemplary signaling between a mobile station and a server to obtain updated call center telephone numbers consistent with principles of the invention.

Mobile station 105 may receive a list of call center telephone numbers from server 110 via SMS, WAP, or other technique/protocol (block 430). Server 110 may retrieve a list of call center telephone numbers from memory based, in some instances, on the MNC, MCC, phone model, and/or IMEI received in request message 510, and then use SMS, WAP, or other technique/protocol to return the retrieved list of call center telephone numbers to mobile station 105. As shown in FIG. 5, server 110 may send a call center list 520, containing an updated list of call center telephone numbers, to mobile station 105. The list of call center telephone numbers may include an up-to-date telephone number for each call center the user of mobile station 105 may need to call to obtain support. For example, the list of call center telephone numbers may include a telephone number for the network operator call center such as a network operator through which the user of mobile station 105 has network service. As another example, the list of call center telephone numbers may include a telephone number for the manufacturer of the user's mobile station 105.

Figure 6B:
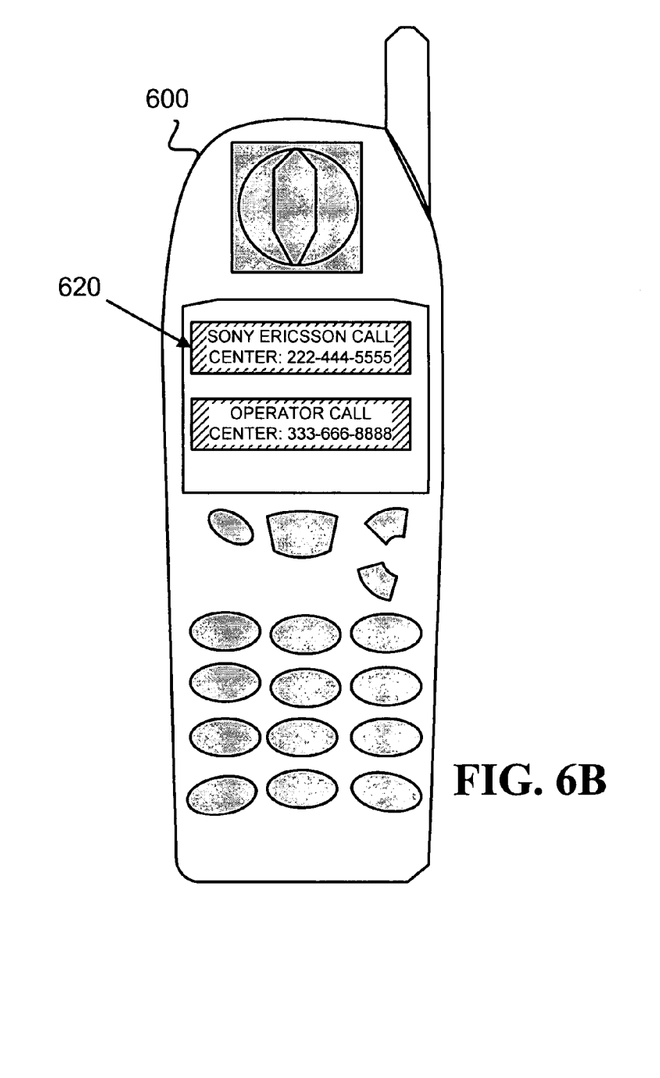

Mobile station 105 may store the list of call center telephone numbers (block 440). In one implementation, mobile station 105 may store the list of call center telephone numbers in memory 330. Mobile station 105 may provide the list of call center telephone numbers to the user (block 450). For example in the illustrative example of FIG. 6B, a list of updated call center telephone numbers may be provided to a user of telephone 600 via a graphical user interface 620. The user may use graphical user interface 620 to subsequently place calls to one or more of the updated call center telephone numbers. In this manner, the user of mobile station 105 may have access to desired information when such information is needed.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while a series of acts has been described with regard to FIG. 4, the order of the acts may be modified in other implementations consistent with the principles of the invention. Further, non-dependent acts may be performed in parallel. In some implementations, a mobile station 105 may be configured to periodically and automatically request updated call center information without a user having to request it. In this manner, mobile station 105 will always have up-to-date call center information.

One skilled in the art will recognize that the principles of the present invention may be applied to any wired or wireless system utilizing any type of multi-access scheme, such as TDMA, CDMA or FDMA. It should be further understood that the principles of the present invention may be utilized in hybrid systems that are combinations of two or more of the above multi-access schemes. In addition, a communication device, in accordance with the present invention, may be designed to communicate with, for example, a base station transceiver using any standard based on GSM, TDMA, CDMA, FDMA, a hybrid of such standards or any other standard.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for execution on a mobile station, comprising:
sending a plurality of messages, each of the plurality of messages sent substantially periodically and without requiring initiation from a user for sending each individual message, from the mobile station to a server, requesting a list of call center telephone numbers, where each of the messages includes at least one of a mobile network code (MNC) and a mobile country code (MCC) associated with a network serving the telephone, an International Mobile Equipment Identity (IMEI) number, or a model number associated with the mobile station, each of the plurality of messages causing the server to retrieve the requested list of call center telephone numbers, from a plurality of telephone numbers, based on at least one of the MNC, the MCC, the IMEI, or the model number associated with the telephone, included in the message;

receiving, at the mobile station, the requested list of call center telephone numbers, from the server, via short message service (SMS) or wireless application protocol (WAP) in response to at least one of the plurality of messages sent from the mobile station to the server;

making available, using the mobile station, some or all the requested list of call center telephone numbers, received at the mobile station from the server, to a user.

2. The method of claim 1, where at least one of the messages is sent from the mobile station to the server via SMS or WAP.

3. The method of claim 1, further comprising:
receiving a user request for updated call center telephone numbers; and
sending at least one of the messages to the server based on the user request.

4. The method of claim 1, where providing the list to a user comprises:
providing the list to the user via a graphical user interface associated with the mobile station.

5. The method of claim 1, where the list of call center telephone numbers comprises at least one of phone manufacturer call center telephone numbers or network operator call center telephone numbers.

6. A method for execution on a server, the method comprising:
storing telephone numbers associated with at least one of network operator call centers, telephone service provider call centers, or telephone manufacturer call centers;
receiving a plurality of requests sent substantially periodically and without requiring initiation from a user for sending each individual request, each of the plurality of requests for call center telephone numbers from a mobile station, where each of the requests for call center telephone numbers includes at least one of a mobile network code (MNC), a mobile country code (MCC) associated with a network serving the mobile station, an International Mobile Equipment Identity (IMEI) number, or a model number associated with the mobile station;
retrieving the call center telephone numbers requested by at least one of the plurality of requests, from the stored telephone numbers, based on one or more of the MNC, the MCC, the IMEI number, or the model number; and
sending at least one of the retrieved call center telephone numbers to the mobile station via short message service (SMS) or wireless application protocol (WAP) so that the mobile station may provide some or all the call center telephone numbers to the user at the mobile station.

7. The method of claim 6, where at least one of the requests for call center telephone numbers is received from the mobile station via SMS or WAP.

8. A communication device, comprising:
a communication interface to send a plurality of messages, each of the plurality of messages sent substantially periodically and without requiring initiation from a user for sending each individual message, to a server, via short message service (SMS) or wireless application protocol (WAP) requesting a list of call center telephone numbers, where the call center telephone numbers are associated with at least one of network operator call centers, telephone service provider call centers, or telephone manufacturer call centers, and
where each of the plurality of messages includes at least one of a mobile network code (MNC), a mobile country code (MCC) associated with a network serving the communication device, an International Mobile Equipment Identity (IMEI) number, or a model number associated with the communication device; and
a processing unit to:
receive at least one of the requested lists of call center telephone numbers from the server,
where the server retrieves, in response to at least one of the messages, the requested list of call center telephone numbers, from a plurality of telephone numbers, based on at least one of the MNC, the MCC, the IMEI, or the model number associated with the telephone, and sends the requested list of call center telephone numbers to the communication device;
and the processor unit further to:
provide the requested list of call center telephone numbers, received from the server, to the user of the communication device.

9. The communication device of claim 8, further comprising:
a user interface to receive a user request for the list of call center telephone numbers,
where at least one of the messages is sent to the server via SMS or WAP based on the user request.

10. The communication device of claim 8, further comprising:
a graphical user interface to provide the received list of call center telephone numbers to the user.

11. A system, comprising:
means for storing telephone numbers associated with at least one of network operator call centers, telephone service provider call centers, or telephone manufacture call centers;
means for receiving a plurality of requests sent substantially periodically and without requiring initiation from a user for sending each individual request, each of the plurality of requests for call center telephone numbers from a mobile station via short message service (SMS) or wireless application protocol (WAP), where each of the plurality of requests includes at least one of a mobile network code (MNC), a mobile country code (MCC) associated with a network serving the mobile station, an International Mobile Equipment Identity (IMEI) number, or a model number associated with the mobile station;
means for retrieving the call center telephone numbers requested by at least one of the plurality of requests, from the stored telephone numbers, based on one or more of the MNC, the MCC, the IMEI number, or the model number; and means for sending at least one of the retrieved call center telephone numbers to the mobile station so that the mobile station may provide some or all the retrieved call center telephone numbers to the user at the mobile station.

12. The system of claim 11, where the retrieved call center telephone numbers include updated call center telephone numbers.

13. The system of claim 11, where at least one of the requests for call center telephone numbers comprises a user request for updated call center telephone numbers, and where the user request is received at predetermined periods of time.

14. The system of claim 11, where the call center telephone numbers are sent to the mobile station via SMS or WAP.

15. The method of claim 6, where receiving at least one of the requests for call center telephone numbers comprises receiving a user request for updated call center telephone numbers.

16. The communication device of claim 9, where the user interface is further to receive a user request for an updated list of call center telephone numbers after the communication device has received call center information.

* * * * *